(No Model.) 2 Sheets—Sheet 1.

E. W. COOKE.
ROLLER JOURNAL BOX.

No. 442,352. Patented Dec. 9, 1890.

Witnesses:

Inventor:

(No Model.) 2 Sheets—Sheet 2.

E. W. COOKE.
ROLLER JOURNAL BOX.

No. 442,352. Patented Dec. 9, 1890.

Witnesses: Inventor:

UNITED STATES PATENT OFFICE.

ERNEST WM. COOKE, OF CHICAGO, ILLINOIS, ASSIGNOR TO THE AMERICAN ROLLER BEARING COMPANY, OF SAME PLACE.

ROLLER JOURNAL-BOX.

SPECIFICATION forming part of Letters Patent No. 442,352, dated December 9, 1890.

Application filed December 16, 1889. Serial No. 333,847. (No model.)

*To all whom it may concern:*

Be it known that I, ERNEST WILLIAM COOKE, a citizen of the United States, residing in Chicago, in the county of Cook and State of Illinois, have invented a new and useful Improvement in Roller Journal-Boxes, of which the following is a specification.

My invention relates to a roller journal-box provided with a series of elastic rings which fit inside of the box. At the outer ends of the box are caps. At the outer ends of the caps are tapered leather rings, which fit round the shaft, over which are placed tapered bushings, which are secured to the outer caps by means of bolts or set-screws. Between the rings and the box I place paper of a suitable thickness, so that when the cap-bolts are screwed down onto the wooden liners the elastic metallic rings will conform themselves to the roller-bearing contained in the box.

My object for having the tapered leather rings and taper bushings is that I can secure the leather rings tight around the shaft or axle and prevent any lubricant that I may place in the box from escaping. This object I attain through the mechanism shown in the accompanying drawings, in which—

Figure 1:
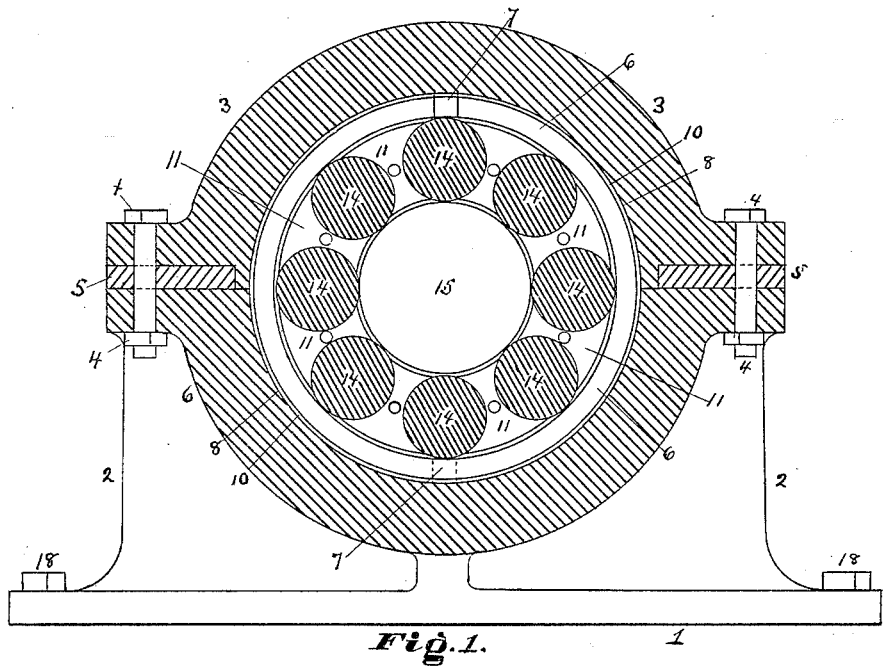
Figure 2:
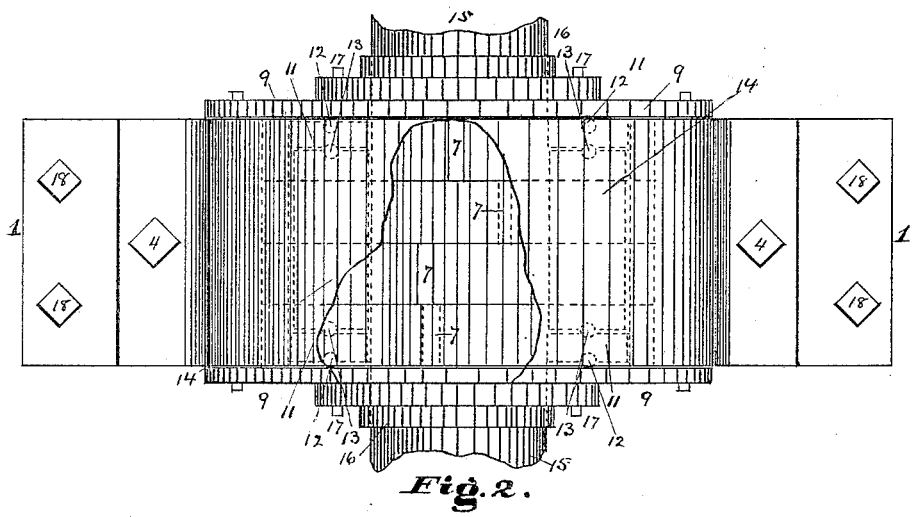
Figure 3:
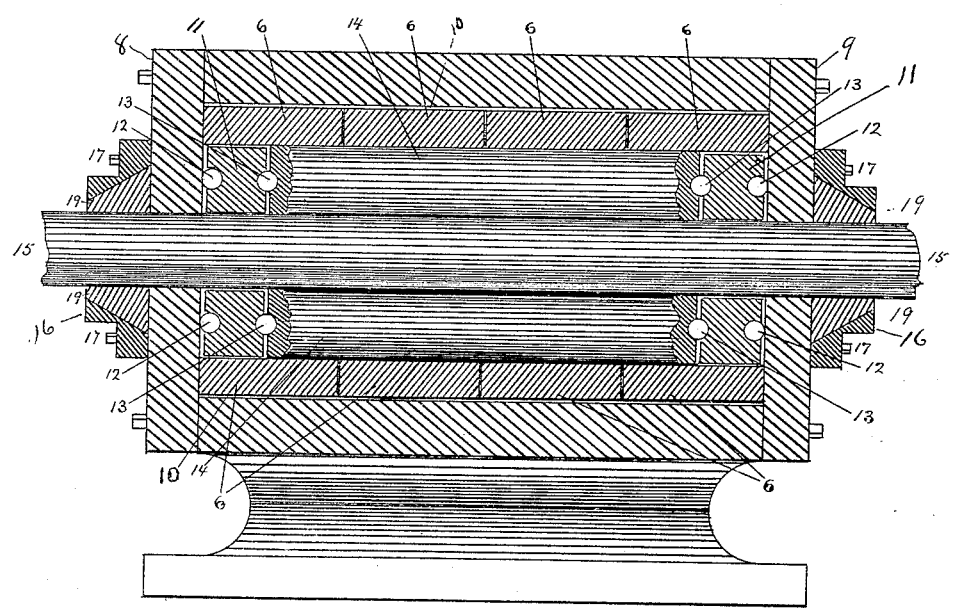
Figure 4:
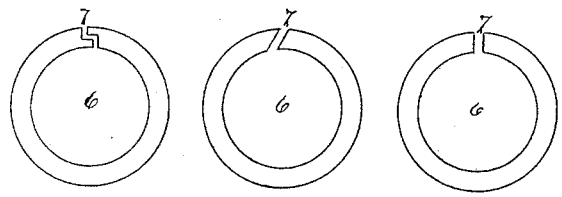

Figure 1 is a sectional view through the roller journal-box in the median line. Fig. 2 is a plan view of the roller journal-box with a section of the top cut away. Fig. 3 is a longitudinal section of the roller journal-box made in the median line. Fig. 4 is a series of annular rings which are placed in the box.

Similar figures refer to similar parts throughout the several views.

Upon the base 1 and step 2 I place a cap or top 3. This cap 3 I bolt to the step 2 by bolts 4. Between the step 2 and cap 3, at the outer ends, I place strips of wood 5, which are held in place by the bolts 4. Inside of the pedestal, which is formed by the step 2 and cap 3, I place a series of metallic rings 6. These elastic rings 6 are split, as indicated by 7. Between the elastic rings 6 and the pedestal I place paper liners 10, which encircle the rings, said paper liners being of a thickness suitable to allow of the elastic rings fitting tightly around a roller-bearing provided with the rollers 14, collars 11, and balls 12 and 13. At each end of the pedestal I secure the plates 8 and 9. Outside of the plates 8 and 9 I place the tapered leather rings 19. Over the tapered leather rings 19 I place the bushings 16, which are secured to the plates 8 and 9 by the bolts or set-screws 17.

I now proceed to explain the method of using the same. I put a layer of paper 10 in the step 2. I then place the rings 6 in the step, with their split or open portions 7 alternating. Upon the top of the rings 6 I place a layer of paper corresponding in thickness to the one below. I then place the pieces of wood 5 in position and place the cap on them and bolt the step 2, pieces of wood 5, and cap 3 together by the bolts 4. I then introduce the shaft or axle and roller-box into the pedestal. I then secure to the pedestal the plates 8 and 9, and to said plates I secure the bushings 16, having first introduced the tapered leather rings 19.

I am fully aware that roller journal-boxes have been made prior to my invention, and I do not therefore lay claim in a broad sense to roller-boxes; but What I do claim, and desire to secure by Letters Patent, is—

1. In a roller journal-box, the combination of a step and cap having between them liners of wood, a series of elastic rings placed inside of the pedestal, and paper liners between said rings and pedestal, all substantially as and for the purpose set forth and described.

2. In an inclosed journal-bearing in which a series of rollers surround a shaft, the combination of a series of split metallic rings placed around the rollers in such manner that the split portions alternate, and thin liners interposed between said rings and the inclosing-casings, all substantially as and for the purpose as set forth and described.

ERNEST WM. COOKE.

In presence of—
  I. MCALLISTER,
  T. E. SHEEHE.